UNITED STATES PATENT OFFICE.

KARL HEINRICH WOLMAN AND BERNARD DIAMAND, OF IDAWEICHE, OBERSCHLESIEN, GERMANY, ASSIGNORS TO MAX BARSCHALL, OF NICE-CIMIEZ, FRANCE.

PRESERVING COMPOSITION FOR FIBROUS MATERIAL.

934,871.

Specification of Letters Patent. Patented Sept. 21, 1909.

No Drawing. Application filed November 6, 1906. Serial No. 342,307.

*To all whom it may concern:*

Be it known that we, KARL HEINRICH WOLMAN, a subject of the Grand Duke of Baden, and BERNARD DIAMAND, a subject of the Emperor of Austria-Hungary, both residing at Idaweiche, in Oberschlesien, in the Kingdom of Prussia, Germany, have invented certain new and useful Improvements in Preserving Fibrous Material, of which the following is a specification.

This invention relates to the art of preserving fibrous material such as wood, roofing-felt, cork-plates and other material composed of cellulose and other organic fiber, by treating the same with antiseptic compounds, preferably in the form of bath or solutions.

The object of the present invention is to take advantage, for this purpose, of the cheapness and preservation power of the metallic salts of strong mineral acids such as sulfates, while, at the same time, avoiding the injurious and destructive properties which prevent the application of such substances to the preservation of organic fiber.

The metallic salts of strong mineral acids such as sulfate of iron, sulfate of copper, and sulfate of aluminum, or mixtures of these salts which are generally used as impregnating agents, are objectionable in view of the fact that they are liable to be decomposed in the presence of water, forming a basic salt and free acid. As is known, free sulfuric acid or other equivalent mineral acid thus liberated acts injuriously on the organic fiber and thus a compound of this character, while preventing or retarding putrefication, exposes the fiber to destruction in another way, whereby its use is rendered more or less disadvantageous. In order to prevent this liberation of free mineral acid from the metallic salts employed as preserving agents, it has been proposed to add the salts of weak organic acids, for example, acetate of ammonia, to the impregnating solution. In this manner the weak acid only is liberated by the decomposition of the salt of the mineral acid which in the case of acetic acid is removed by volatilization. However, the addition of acetate of ammonia, which is wholly deficient in antiseptic qualities, diminishes the antiseptic properties of the solution inasmuch as the acetic acid to be volatilized acts as a diluent of the solution, having no antiseptic properties in itself, but on the contrary furnishing nourishment for the organisms destructive to the fiber.

It is, therefore, the further object of the invention to not only prevent the liberation of the injurious strong acid, but coincidently therewith to prevent the decrease in the antiseptic properties of the metallic salts when adding such neutralizing agent.

For this purpose, the present invention consists in combining with the salt of a mineral acid, such as a metal sulfate, a substance capable of neutralizing free mineral acid and yielding or liberating when so combined an antiseptic. Preferably such substance should have antiseptic properties so combined as in the examples hereinafter given. Such compounds may be used in various ways for treating the fiber, but we prefer to apply the same in the form of a bath, preferably a solution of such compounds.

Among the antiseptic substances to be combined with the metal salts of the strong mineral acids for preparing the antiseptic compound, which, as stated, is preferably in the form of a bath, we have found the alkali compounds of certain hydroxl containing derivatives of the hydrocarbons of the aromatic series, the hydroxl hydrogen of which is capable of being replaced by metal. Compounds of bodies of the cresol or naphthol type are particularly well adapted for the purpose in question. These alkali compounds are decomposed even by the most dilute sulfuric acid and will therefore neutralize the free sulfuric acid as quickly as formed. By adding them to the impregnating compound, or solution, they will therefore prevent the injurious action of the free sulfuric acid on the wood or other fibrous material. These alkali compounds of this group of bodies are themselves antiseptics, but their antiseptic action is even increased when these bodies themselves are liberated from the alkali compound by the mineral acid. Thus, as we have found, the addition of these antiseptic compounds produces a three-fold effect: Firstly the antiseptic properties of the preserving compound or solution are increased; secondly, the injurious free mineral acid which may be formed is neutralized; thirdly, the antiseptic action of the compound which is added is increased by the separation of the free hydroxylated bodies therefrom.

In order to carry out our invention it is not necessary to separately use the above mentioned alkali compounds of the stated bodies in a ready prepared, pure state, but crude solutions containing such compounds may be employed. We have found that good results will be obtained by employing the alkaline aqueous solutions or wash-waters obtained in the process of refining organic distillation products, such as crude petroleum, tar, tar-oils, or the like by means of caustic soda lye, such solutions or wash-waters containing phenolic and acid components of raw petroleum, tar, tar-oil, or the like. These solutions or wash-waters may be used as obtained or they may be reduced to dryness to reduce their bulk and fit them for shipment.

We find that the alkaline wash-waters, above-mentioned, other alkaline wash-waters obtained in refining the products of the destructive distillation of resin or colophony or the like, will also produce good and similar results and they are considered equivalent for this purpose. It is clear from the above that this improvement in the art has the further merit of enabling waste products hitherto regarded as almost worthless to be utilized with advantage. We have also obtained good results by substituting for the above substances, for neutralizing free mineral acid and yielding an antiseptic body, salts of benzoic or salicilic acid, and these are to be also considered as equivalents for the said substances. We have also found that the salts of hydrofluoric acid and of silicofluoric acid both of which are weak, bactericidal acids when used in connection with a strong mineral acid, as above set forth, will produce good results in the above connections and they are all to be classed among the equivalents. The hydrofluoric or silico fluoric acid liberated, when thus used, constitutes a very effective antiseptic preservative for the fibrous material.

In order to more fully disclose our invention, we will now describe by way of illustration, some examples of preserving compounds made under our invention and the manner of preparing and using the same.

For the purpose of obtaining 100 kilograms of our preserving compound, we mix

Ferrous sulfate ____ 65 kilograms
Aluminum sulfate__ 15 kilograms
Sodium fluorid ____ 10 kilograms
Sodium silico-fluorid 10 kilograms 100 kilograms We prefer to add 50 kilograms of this compound in solid form to 1000 liters of water and thereupon well boiling the whole when the same will be ready for use. Iron and aluminum fluorid and silicofluorids being soluble, the mixture described forms a solution.

The fibrous material, such as wood, roofing-felt, cork-plates or the like, may be impregnated by immersing the same into such solution or bath. The bath is kept at its original strength by adding 10 kilograms of the above material in solid form after the treatment of each cubic meter of the material. Care should also be taken to maintain the quantity of the bath that is to say, by adding sufficient water after each operation with such material and before beginning the following operation. We find that one cubic meter of wood absorbs about ⅕ cubic meter of the preserving bath, but since a considerable quantity of water is supplied by the condensation of the steam which is blown in during the impregnating operation, only little fresh water will be required after each operation. The impregnating bath may be used for years.

The following is an example of the application of an alkaline wash water obtained in refining an organic distillation product in the carrying out of our invention. To obtain about 100 kilograms of our impregnating compound in solid form, we first mix 65 kilograms of ferrous sulfate and 15 kilograms of aluminum sulfate. On the other hand we treat 300 kilograms of the so-called light oil (being the second product of the fractional distillation of brown-coal) with 15 kilograms of caustic soda lye containing 40 per cent. of sodium hydroxid and after having separated the alkaline solution from the said light oil we reduce the solution to dryness. The residue is then pulverized and added to the aforesaid mixture of the inorganic salts.

For the purpose of obtaining the impregnating compound in the form of solution, we dissolve 32.5 kilograms of ferrous sulfate and 7.5 kilograms of aluminum sulfate in about 1000 liters of water and add 15 kilograms of the aforesaid alkaline wash-water. The aromatic phenols and acids contained in such wash-waters likewise form soluble iron and aluminum salts, so that no important precipitation by double decomposition occurs in forming the desired solution. The phenols are weakly acid in nature, being frequently called acids, as in the case of carbolic acid, and in a free state are extremely bactericidal and antiseptic; as are also the aromatic acids.

Having thus fully described our invention, what we claim is:—

1. A preserving composition for fibrous material comprising a soluble mixture of a metallic salt of a strong mineral acid with the alkali extract of condensed products of destructive distillation.

2. A preserving bath comprising a solution of a mixture of a metallic salt of a strong mineral acid and the alkali extract of condensed products of destructive distillation.

3. A preserving composition comprising a mixture of a metallic salt of a strong mineral acid with an alkali extract of tar.

In testimony whereof we have hereunto set our hands in presence of two subscribing witnesses.

KARL HEINRICH WOLMAN.
BERNARD DIAMAND.

Witnesses:
HENRY HASPER,
WOLDEMAR HAUPT.